United States Patent [19]

Gey

[11] Patent Number: 4,865,141

[45] Date of Patent: Sep. 12, 1989

[54] DEVICE FOR CHANGING OVER A VEHICLE PROVIDED WITH WHEELS TO A TRACK VEHICLE

[76] Inventor: Leo Gey, Stuehrmann's Hoehe 17, 2805 Stuhr 2, Fed. Rep. of Germany

[21] Appl. No.: 150,525

[22] Filed: Jan. 29, 1988

[30] Foreign Application Priority Data

Jan. 30, 1987 [DE] Fed. Rep. of Germany ....... 3702818

[51] Int. Cl.⁴ .............................................. B62D 55/04
[52] U.S. Cl. ..................................... 180/9.26; 180/6.7; 180/9.21
[58] Field of Search .................... 180/6.2, 6.7, 9.21, 180/9.26, 9.28, 9.42, 9.46

[56] References Cited

U.S. PATENT DOCUMENTS 4,391,343  4/1983  Deare ................................ 180/9.28
4,493,385  1/1985  Shiber ................................. 180/6.2
4,702,330  10/1987 Volter et al. ....................... 180/6.2

Primary Examiner—Charles A. Marmor
Assistant Examiner—Donn McGiehan
Attorney, Agent, or Firm—Michael J. Striker

[57] ABSTRACT

A motor vehicle which can be changed over from a wheeled vehicle to a track vehicle includes two track aggregates provided with steering or drive wheels positioned coaxially with the drive axles of the vehicle and attached to the rims of the drive wheels of the vehicle by rotationally supported spacers which include tighteners to connect each of the drive wheels by the track aggregate to the rim of the respective wheel of the vehicle.

18 Claims, 3 Drawing Sheets

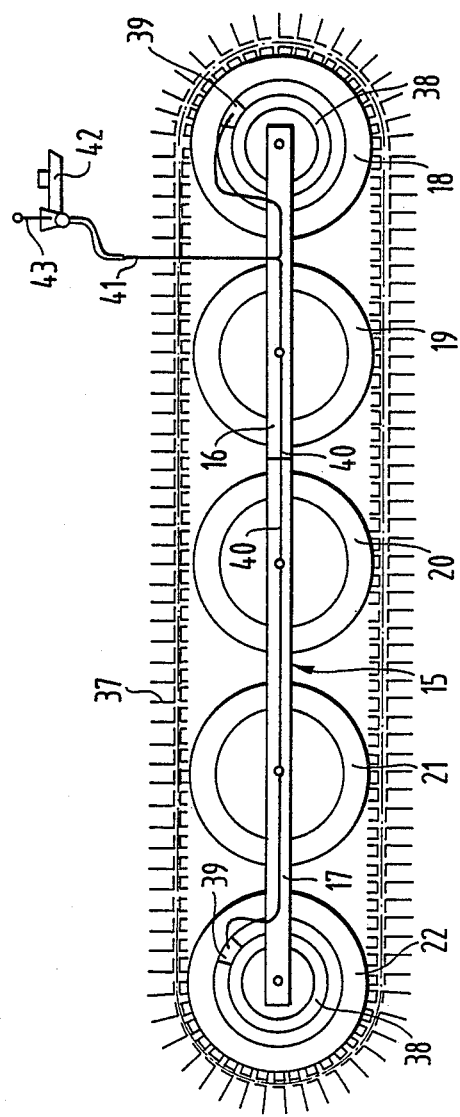
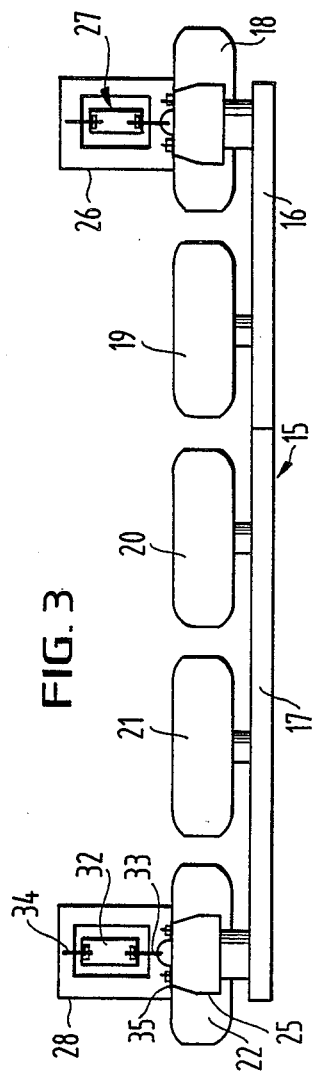
FIG. 2
FIG. 3

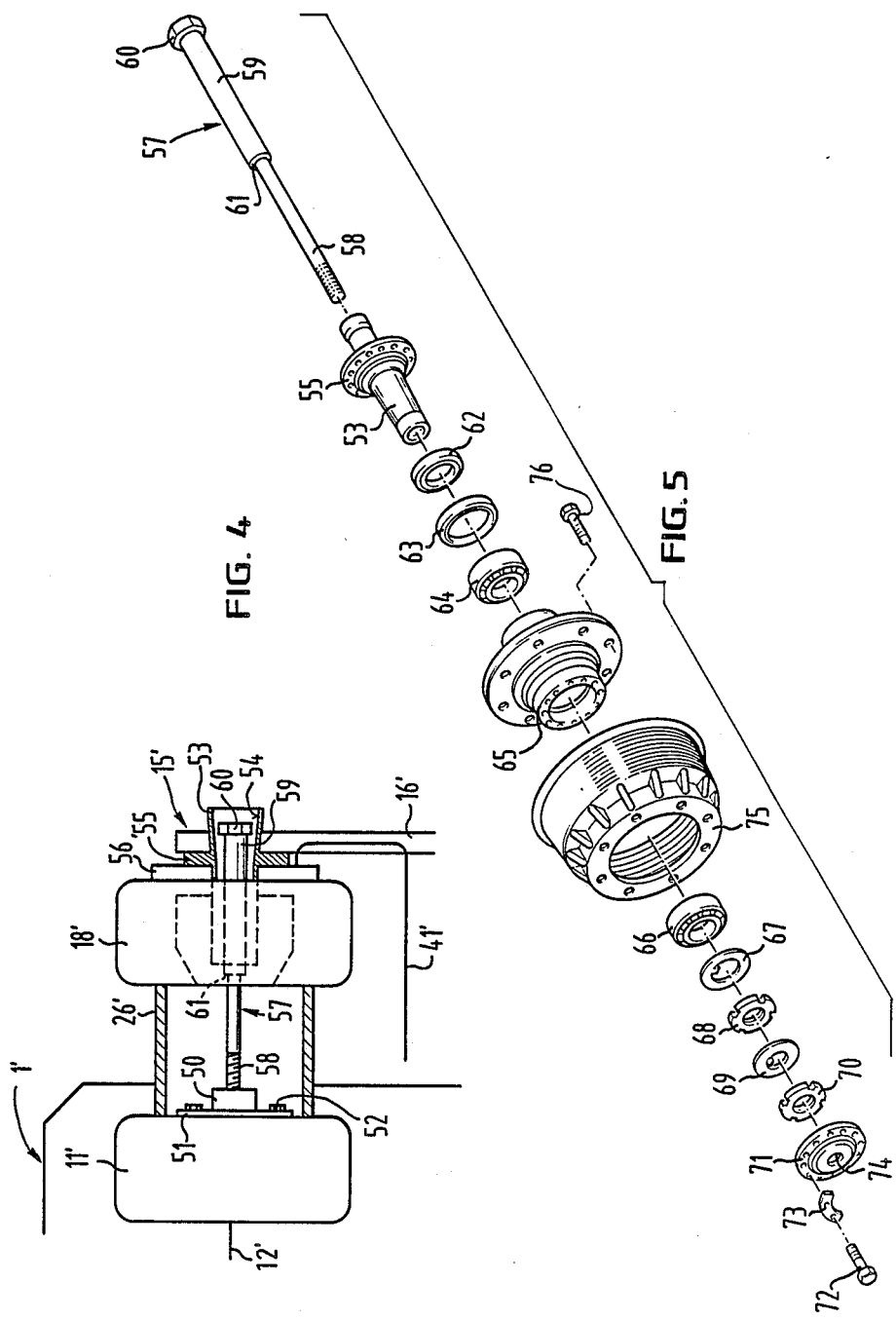

DEVICE FOR CHANGING OVER A VEHICLE PROVIDED WITH WHEELS TO A TRACK VEHICLE

BACKGROUND OF THE INVENTION

The present invention relates to a device for changing over a vehicle provided with wheels to a track vehicle.

Devices or vehicles which can travel on the wheels but be changed over to travel on tracks normally include two chain or caterpillar aggregates connected with the chassis of the vehicle and positioned at two opposite sides thereof. Each aggregate supports at least two wheels which serve for driving and steering the track and over which the track runs, whereby a torque translation device connected to the drive axle of the automotive vehicle for driving the drive wheel corresponds to each chain or aggregate, and brakes, which are actuated separately from the vehicle by the steering control device, are provided for both chain or track aggregates.

A change-over arrangement with track of this type has been disclosed, for example in DE-PS 1,045,250. This conventional device offers the possibility to change over the wheeled vehicle to the track vehicle and vice versa depending on soil conditions. Two chain or track aggregates are formed identically to each other and have the length which exceeds the length of the vehicle whereby the drive wheel of the track in the assembled position is arranged in the tail region of the vehicle which the steering wheel of the track or change projects forwardly beyond the vehicle. The torque translation device includes two wheels connected to each other to be driven by a translation chain. On of these wheels is mounted, after the removal of the respective rear wheel from the drive axle, on this axle, while the other wheel is connected to the chain drive wheel. The chain steering wheel at the front end of the chain aggregate is coaxial with the brake drum which, after the removal of the respective front wheel, is also connected to the front axle stump of the vehicle by the rod or bar so that the steering device of the wheeled vehicle also serves for steering the track vehicle because the steering turning cycle over the connected rod leads to a respective actuation of the drum of the brake and thus to the braking of the track on the one side of the vehicle only which causes, as known, the change of direction or turn. After changing over, the track or chain aggregates, which replaced the wheels removed from the vehicle, are arranged substantially below the vehicle, and project laterally beyond the vehicle with the rear torque translation device and the front brake device.

The disavantages of the known device are the irksome conversion which leads to the placement of the tracks below the vehicle, which makes the jacking up of the vehicle necessary and the vehicle wheels must be removed from the body of the vehicle. A comparatively great weight of the tracks, which is limited by the length of the aggregates and the torque translation device and brake device, presents further difficulties because to bring the chain or track aggregates to their positions before assembling is not simple at all. In addition to securing of the track aggregates or their elongated frames to the vehicle it is necessary to connect the torque translation device to the drive axle and the brake-actuating rods to the front axle stump. These operations can be carried out only in a special service. Therefore often the aforedescribed conversion of the wheeled vehicle to the track vehicle to adapt to changing soil conditions are not realized in practice. Also, storage of heavy track components during the operation of the vehicle on the wheels can present further difficulties. It is particularly impossible in practice or at least very undesirable to carry along two track aggregates, during the travelling on the wheels, as roof poles or hanging loads. Thus, the possibilities of changing over a wheeled vehicle to a track vehicle are limited and the known device has no flexibility for such charging over.

DE-AS 18 07 390 discloses a tractor which includes two chain aggregates positioned laterally of the vehicle, and the wheels remain on the vehicle during the track operations. The drive wheel of the track is connected coaxially to the drive axle. However, the known device can not provide a pure tracks travel and track act as supports for the vehicle running on the wheels. This presents a problem because the track arrangements are stationarily positioned on the vehicle and can be lowered to an operative position from the lifted inoperative position by means of a pressure roller carriage. Thereby the front drive wheel of the track is positioned behind the front wheel which also acts as a steering wheel in the additional track operation. Here short additional tracks can be utilized, and the pure track travel of the vehicle is not possible. The track arrangements should be either removed from the vehicle or always be carried along by the vehicle which leads to a substantial enlargement of the width of the vehicle.

SUMMARY OF THE INVENTION

It is an object of the present invention to provide an improved vehicle which is easily convertible from the vehicle which is able to travel on wheels to the vehicle which can move on the tracks only.

It is another object of this invention to provide a device which would make an easy and quick change over of the wheeled vehicle into a track vehicle.

It is yet a futher object of the invention to provide a device of the foregoing type with compact and light chain aggregates.

These and other object of the invention are attained by a combination of a power vehicle with a device for changing over a power vehicle provided with wheels to a track vehicle, comprising track aggregates positioned at two opposite sides of the vehicle and connectable with a chassis of the vehicle; at least two wheels positioned on each of said aggregates for driving and steering a track of each aggregate, said track of each aggregate running over said two wheels, the power vehicle comprising two drive axles and two torque translation devices each connected to a respective drive axle for driving said wheels and corresponding to a respective track aggregate, two brakes each corresponding to the respective track aggregate; steering means, said brakes being actuated by said steering means separately from the vehicle, said track aggregates being self-supported on individual underframes, each aggregate including two spacers rotationally supported thereon, said spacers being spaced from each other by a distance corresponding to a distance between said two drive axles of the vehicle; and means to rigidly connect said spacers with wheel rims of the vehicle, said vehicle including drive wheels, said spacers with said drive wheels forming said torque translation devices, said steering means being formed as structural components of said aggregates and including re-orientable brake lines, said steering means including at least one actuating element which can be easily moved to and out of operative position in the vehicle.

With the vehicles provided with separate brake devices for drive wheels means for selectively switching a common or individual actuation of the separate brake devices may be provided, which, at the same time, form the brakes for the track aggregates. In this case, also, the track aggregates are self-supported on individual underframes, each aggregate including two spacers rotationally supported thereon, said spacers being spaced from each other by a distance corresponding to a distance between said two drive axles of the vehicle, said spacers being axially rigidly braced with the rims of the drive wheels of the vehicle, said spacers with said drive wheels forming said torque translation devices.

A support for mounting said steering means may be provided, said support being attachable to the vehicle.

Said brakes may be hydraulically operated and the brake lines may be brake conduits, said brakes each including a main brake cylinder and said actuating element formed by an actuating lever, the main brake cylinder and the actuating lever of each brake being insertable in the vehicle during the assembly of the track aggregates.

The connecting means may be provided at a wheel rim, to which each respective spacer is connected, with a connecting plate.

The spacer may be braced to said connecting plate by means of a tightener.

The spacers may be each tubular, each spacer accommodating a respective tightener and being formed with windows to provide access to said tightener.

The connecting means may also include a clamping bolt extending through said spacer, a clamping nut connected to said connecting plate and receiving said bolt to clamp it to said rim of the wheel, each of said two wheels of the track aggregate including an axle stump connected thereto and having a central bore, said bolt extending through said central bore, said axle stump supporting a hub of the respective wheel on the underframe of the track aggregate.

The clamping bolt may include a threaded portion, a bolt head and an elongated portion between said threaded portion and said head, said elongated portion being of a diameter greater than that of said threaded portion to form therebetween an annular shoulder, said connecting means further including a clamping element axially abutting against said shoulder in a clamped position of said bolt, said clamping element being connected to an end face of said hub which faces the vehicle wheel.

The head of said clamping bolt may be inserted in said central bore of said axle stump in the clamped position of said bolt.

The spacers may be rigidly connected to said wheels of said track aggregates and supported thereby.

The two wheels of each track aggregate may be steering wheels which are arranged at a front and a rear end of each track aggregate, respectively, said two wheels being positioned on a front and a rear drive axle of the vehicle, respectively and simultaneously being drive wheels.

The length of each spacer may be selected so that each track aggregate is positioned laterally of and close to the vehicle.

Each spacer may be dimensioned so that the spacers, with the track aggregates mounted to the vehicle, are engaged in outer-rim flanges of the respective wheels of the vehicle.

The caterpillar aggregates may be dimensioned so that the spacers with respective connecting plates are position at an adjusted level to said drive axles, before assembling of said track aggregates.

The underframe of each track aggregate may be subdivided into two elongated portions which are movable relative to each other and can perform relative motions about an axis of elongation of the underframe.

The elongated portions of each underframe may be telescopically connected to each other whereby a withdrawal of each portion is limited by the length of said track.

The steering means of the track wheels may be actuated indendently from a wheel steering of the vehicle.

For changing over the vehicle on the wheels to a track vehicle, without the removal of the wheels from the vehicle, the connecting plates are connected to the hubs of the vehicle wheels either with threaded bolts or by other suitable fastening means provided on the rim of the respective wheels. The tracks can roll near the vehicle laterally thereof while the spacers are aligned with the axles of the wheels. Then a tightener of each spacer is actuated so that the spacer is connected to the connecting plate on the rim of the respective wheel. The vehicle should not be lifted or lowered for this purpose. In the case when the height of the track aggregates is greater than the height of the wheels the respective wheel axle is brought to a desired level by means of a lifting jack used for a usual tire exchange, whereby after the assembly the vehicle is supported by the track aggregates on the ground.

By the aforedescribed operation carried out in a reverse manner the changing over of the track vehicle to the wheeled vehicle is possible.

Both caterpillar aggregates are provided with individual hydraulic systems. Both main brake cylinders are connected with oil tanks, and the actuating levers are connected directly to the brakes by brake lines which can be vented or replaced by new ones. The support for both main brake cylinders can be provided in the vehicle. The main brake cylinders can be connected to the support preliminarily in the vicinity of the vehicle. To protect the brake conduits they can be laid through the door sealing. Thus the track pillar vehicle is ready to operate. No special assembling of brake equipments and no change of the placement of the brakes of the vehicle are required. After attaching of the track aggregates to the vehicle the steering with the steering device of the vehicle is no longer possible. The steering of the track drive is carried out by an individual actuation of the left-hand or right-hand track brake which by the simultaneous actuation of the actuating levers of both brakes, the vehicle is decelerated and can be stopped. An additional security is provided by the brake device of the vehicle because both caterpillar aggregates are stopped by the actuation of two levers.

For the vehicles which have left-hand and right-hand brakes the track aggregates may have no additional brake means. In this case, steering is provided by the brake device of the vehicle.

The present invention ensures that the vehicle on the wheels can be easily converted to a track vehicle not only by an expert driver and without any special equipment. A comparatively small weight of track equipment presents a further advantage of the invention. The track aggregates are laterally spaced from the vehicle by a very small distance and are easily mountable and dismountable. The caterpillar change over device can be utilized with all vehicles having a differential, including trucks and jeeps as well as personal motor vehicles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a side view of the aggregate of FIG. 1, completed with a hydraulic brake equipment and an operation lever;

FIG. 3 is a plan view of one of two aggregates, with the track omitted, and illustrating connecting devices for connecting track aggregates to the power vehicle of a first embodiment;

FIG. 4 is a partially sectional view of the connecting device for securing the track aggregate to the vehicle, according to a modified embodiment; and FIG. 5 is an exploded perspective view of the assembly shown in FIG. 4.

DETAILED DESCRIPTION OF THE PREFERRED EMBODIMENTS

Figure 1:
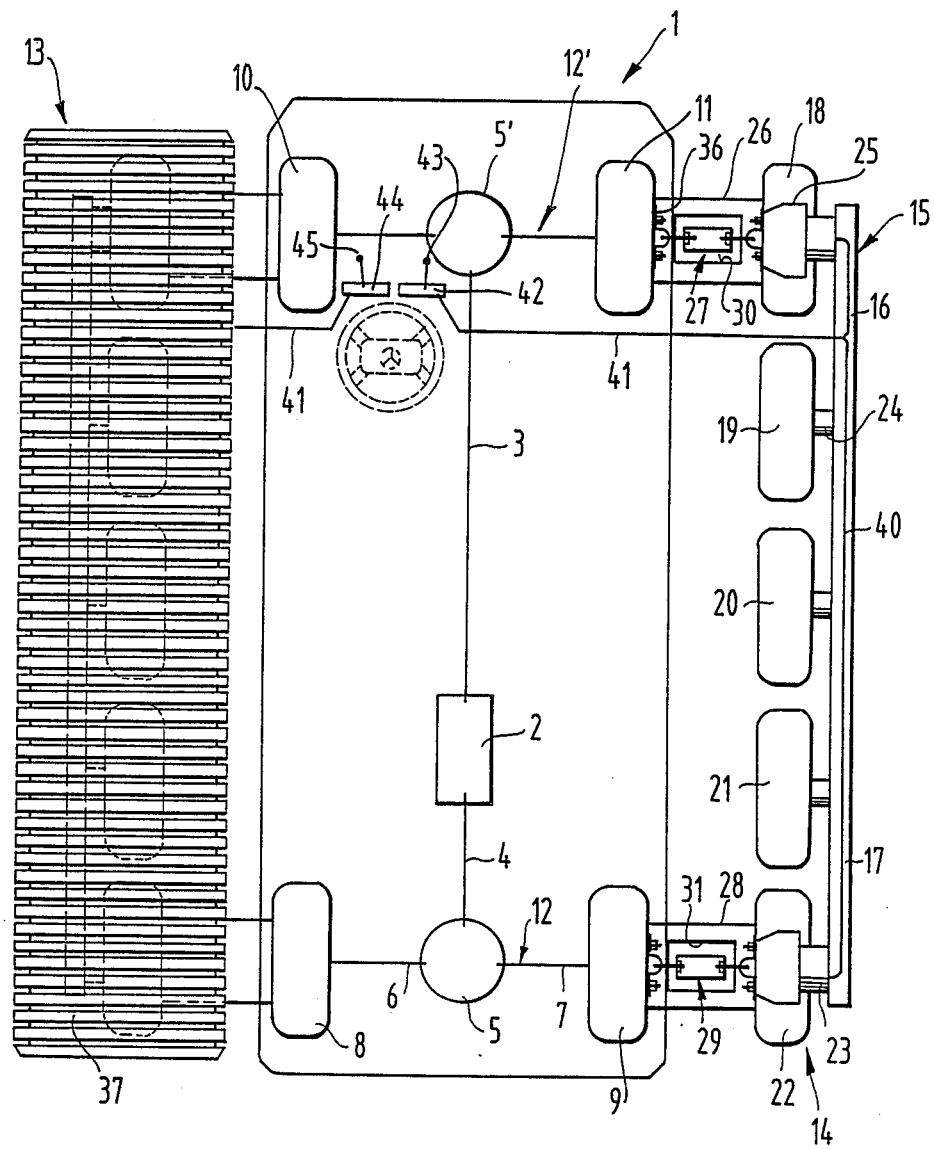
FIG. 1 is a schematic plan view of the vehicle convertible into a track, wherein the caterpillar of the right-hand aggregate is omitted and the various structural components are shown uncovered.

Referring now to the drawings in detail it will be seen that reference numeral 1 designates a power vehicle which is provided with a non-shown internal combustion engine to which a variable gear 2 is connected. Drive shafts 3 and 4 extend in two opposite directions from the variable gear 2. The drive shaft 4 drives, via a compensating device in the form of the differential gear 5 two semiaxles 6 and 7 with the left rear wheel 8 and right rear wheel 9. The semiaxles 6 and 7 form the rear axle 12. A second differential gear 5' is interconnected between two semiaxles of the front axle 12' provided with two front wheels 10 and 11. Also in place of the all-wheel drive only a drive for the rear wheels 8, 9 can be provided whereby the front wheels 10, 11 would be able to rotate freely and independently from each other. Also possible to provide the device of this invention only with a front wheel drive.

At two opposite sides of the power vehicle 1 are positioned track or chain aggregates 13 and 14 which are formed identically. The chain aggregates each comprises a chassis or underframe 15 which is formed by a substantially elongated support which is assembled from the front elongated frame portion 16 and the rear elongated frame portion 17. Both frame portions 16 and 17 are telescopically connected to each other whereby they can perform a relative rotation about a common axis of elongation.

On each of the chain or track aggregates 13 and 14 are rotationally supported, at the inner side which faces the vehicle 1, a front drive wheel 18, three guide wheels 19, 20, 21 and a rear drive wheel 22, these wheels being positioned in a row. Depending on the type of the vehicle either the front wheel or the rear wheel or both can be drive wheels. On wheels hubs 25 of two external wheels 18 and 22, are provided brake stumps or brake discs. It is also possible to employ a brake stump or brake disc on only one of two external wheels of each chain aggregate. The axial distance between two external wheels 18, 22 corresponds to the axial distance between the rear axle 12 and the front axle 12'. The number and dimensions of the guide wheels 19 to 21 depend on the distance between the axles of the vehicle 1. The drive wheels, steering wheels and guide wheels can be formed as toothed wheels or pneumatic tires or hard rubber wheels. They are connected with the underframe 15 by bearing axial stumps 23 and 24.

The caterpillar aggregates 13 and 14 are rigidly connected, within the range of converting the wheeled vehicle into the track vehicle, with the power vehicle 1 so that external wheels 18 and 22 are coupled with the left-side vehicle wheels 8 and 10 or right-side vehicle wheels 9 and 11, as shown on the right side of the vehicle in FIG. 1. For this purpose are provided a front tubular spacer 26 with a front tightener or tension lock 27 and a rear tubular spacer 28 with a respective rear tightener or tension block 29. Each tightener 27, 29 is positioned within the respective spacer 26, 28 each of which has two or more windows 30, 31, by means of which each tightener is accessible and is actuated. For connecting the wheels 8 to 11 of the vehicle with the steering or drive wheels 18, 22 of the track aggregates, other spacers or locking deivices can be employed.

With reference to FIG. 3 it is seen that each tightener 27, 29 has a threaded sleeve 32, the two halves of which have either the right pitch thread or left pitch thread and receive respective threaded rods 33 and 34. The threaded rod 33 at the outer end thereof is hooked in an eyelet plate 35 or, alternatively is provided with an eyelet plate which is screwed to the wheel hub 25.

The outer end of threaded rod 34 is hooked in or otherwise connected to a connecting plate 36 corresponding to the eyelet plate 35 as shown in FIG. 1. The connecting plate 36 at its inner side is rigidly secured, for example by screws, with one of wheels 8 to 11 of the vehicle 1.

It is understandable that with such an arrangement, the wheels in wheel pairs 9 and 22 or 11 and 18 or their hubs or rims can be rigidly connected to each other with an axial tightening of the spacers 26 and 22 so that driving forces can be translated via respective spacers to the caterpillar aggregates 13 and 14 and the latter would take up the weight of the vehicle. The vehicle weight is then distributed over the surface of the bottom because track 37 run over the wheels 18 to 22 as shown in FIGS. 1 and 2.

As seen from FIG. 2 the steering or drive wheels 18 and 22 are provided each with a track aggregate brake 38 which corresponds to a wheel brake cylinder 39. Brakes 38 can be formed as drum-type brakes or disc-type brakes. The wheel brake cylinders 39 of wheels 22 and 18 are connected to each other by a hydraulic brake line 40 from which an elastic brake conduit 41 leads to a right-hand main brake cylinder 42 or a left-hand main brake cylinder 44. The main brake cylinders 42 and 44 (FIG. 1) are component parts of respective track aggregates 13, 14 and are plugged in a support for use inside the vehicle. The support is positioned near the driver. Operating levers 43, 45, by which a pressure loading of the wheel brake cylinders 39 is controlled, are positioned on the main brake cylinders 42 and 44, respectively.

As can be seen from FIG. 1 a respective main brake cylinder with the operating lever provided thereon corresponds to each track aggregate. The support for the left-hand and right-hand main brake cylinders with their operating levers can be positioned in the region of the steering wheel so that they will be easily actuated from the driver seat. Elements 40 to 45 form a steering control device for the track drive whereby by an individual actuation of the levers 43 and 45, the right-hand braking or the left-hand braking is effected to produce a direction change of the vehicle. The joint actuation of levers 43 and 45 would cause the braking of the track vehicle.

Referring now to FIGS. 4 and 5 it will be seen that the device for connecting the track aggregate to the power vehicle according to another embodiment of the invention has no tightener but, similarly to the first embodiment described in connection with FIGS. 1 and 3, has spacers which are closed elements having no windows. Such a connection device shown in FIG. 4 for the front right-side wheel is provided for all four wheels of the vehicle. The detailed description of the similar structural components in FIGS. 4 and 5 will be herein omitted. Spacer 26' is provided in this modified embodiment similar to that of FIG. 3.

As shown in FIG. 4, a reinforced clamping nut 50 positioned in the extension of the front axle 12' is secured to the vehicle wheel 11'. The clamping nut 50 has a connecting plate 51 which has bores penetrated by the bolts of the wheel 11', which bolts are tightened by nuts 52.

Wheel 18' aligned on the vehicle wheel 11' is supported on an axle stump 53' positioned in a longitudinal frame portion 16' of the chassis 15' of the caterpillar aggregate. The axle stump 53' has a central opening 54 which extends over the whole length of the stump. The rotation-fixed axle stump 53 also has a shaped connection flange 55 by means of which this stump is secured to the chassis 15. Also, a rotation-fixed anchoring plate 56 is connected to the flange 55 by means of non-shown brake shoes. As also seen in FIG. 4, a brake line 41' extends through the anchoring plate 56 towards the cylinders for actuating the brake shoes.

A clamping bolt 57 has a threaded part.58 which is screwed into the clamping nut 50. Bolt 57 also has an elongated portion 59 of a greater diameter and a bolt head 60 to which a tightening tool is applied. An annular shoulder 61 is formed at the transition between threaded portion 58 and elongated portion 99. Shoulder 61 in assembly of the connection device faces the vehicle wheel 11'. The head 60 of clamping bolt 57 in the operative position thereof is lowered and is inserted with a play in the central bore 54 of the axle stump 53. Bore 54 can be covered with a lid or plug.

FIG. 5 further illustrates structural components of the connecting device, pulled out from assembly, namely a bearing ring 62, a retaining ring 63, a first bearing 64 for the hub 65 of wheel 18', a second bearing 66 for the hub 65, a thrust ring 67, and a nut 68 which is screwed on the internal end of the axle stump 53 to be held relative to hub 65 in the assembled position. A safety washer 69 and a counter nut 70 coreespond to the nut 68. After tightening the nuts 68 and 69, the safety washer 69 is deformed to prevent losening of the bolt connection.

Further, a disc-shaped clamping element 71 is provided, which is secured in the screwed position by a safety sheet-like element 73 to the end face of hub 65. The clamping element 71 can not be displaced on the axle stump 53. Clamping element 71 has a bore 74 which is as large as to receive the threaded portion 58 of clamping bolt 57. The annular shoulder 61 of clamping bolt 57 axially lies against clamping element 71. Also shown in FIG. 5, is a brake drum 75 which is connected to the hub 65 by bolts 76. Wheel 18' is positioned on this brake drum 75. FIG. 5 does not depict the aforementioned anchoring plate with braking shoes which lie against the flange 55 of the axle stump 53.

Upon screwing the clamping bolt 57 into the clamping nut 50, the annular shoulder 61 presses, via clamping element 71 and hub 65, the spacer 26' against the rim of the vehicle wheel 11', whereby a rigid clamping is obtained. All the parts clamped to each other on the clamping bolt 57 rotate together relative to the stationary axle stump 53. Thus the clamping does not cause any axial pressure on the axle stump 53 or its flange 55, which makes the employment of special axial pressure bearings superfluous.

The advantage of the embodiment of FIGS. 4 and 5 resides in that the clamping bolt 57 is easily accessible from its external end and can be actuated by means of a socket wrench axially insertable into bore 54 of the axle stump 53. Track aggregates can be easily and quickly connected to or diconnected from the vehicle.

It will be understood that each of the elements described above, or two or more together, may also find a useful application in other types of devices for converting vehicles with wheels into a caterpillar vehicle differing from the types described above.

While the invention has been illustrated and described as embodied in a device for converting a vehicle with wheels into a track it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a combination of a power vehicle with a device for changing over a power vehicle provided with wheels to a tracked vehicle, comprising track aggregates positioned at two opposite sides of the vehicle and connectable with a chassis of the vehicle; at least two wheels positioned on each of said aggregates for driving and steering a caterpillar of each aggregate, said track of each aggregate running over said two wheels, the power vehicle comprising two drive axles and two torque translation devices each connected to a respective drive axle for driving said wheels and corresponding to a respective track aggregate, two brakes each corresponding to the respective track aggregate; steering means, said brakes being actuated by said steering means separately from the vehicle, the improvement comprising said track aggregates being self-supported on individual underframes, each aggregate including two spacers rotationally supported thereon, said spacers being spaced from each other by a distance corresponding to a distance between said two drive axles of the vehicle; and means for connecting said spacers with respective rims of the wheels of the vehicle, said vehicle including drive wheels, said spacers with said drive wheels forming said torque translation devices, said steering means being formed as structural components of said aggregates and including re-orientable brake lines, said steering means including at least one actuating element which can be easily moved to and out of operative position in the vehicle.

2. The combination as defined in claim 1, wherein a support for mounting said steering means is provided, said support being attachable to the vehicle.

3. The combination as defined in claim 1, wherein said brakes are hydraulically operated, said brake lines being brake conduits, said brakes each including a main brake cylinder and said actuating element formed by an actuating lever, the main brake cylinder and the actuating lever of each brake being insertable in the vehicle during the assembly of the track aggregates.

4. In a combination of a power vehicle with a device for changing over a power vehicle provided with wheels to a track vehicle, comprising track aggregates positioned at two opposite sides of the vehicle and connectable with a chassis of the vehicle at least two wheels positioned in each of said aggregates for driving and steering a track of each aggregate, said caterpillar of each aggregate running over said two wheels, the power vehicle comprising two drive axles and two torque translation devices each connected to a respective drive axle for driving said wheels and corresponding to a respective track aggregate, two brakes each corresponding to the respective track aggregate; and steering means, said brakes being actuated by said steering means separately from the vehicle, the improvement comprising separate brake devices for drive wheels of the vehicle means for selectively switching a common or individual actuation of said separate brake devices, said brake devices simultaneously forming said brakes for the track aggregates, said track aggregates being self-supported on individual underframes, each aggregate including two spacers rotationally supported thereon, said spacers being spaced from each other by a distance corresponding to a distance between said two drive axles of the vehicle, said spacers being axially rigidly braced with wheel rims of the vehicle, said spacers with said drive wheels forming said torque translation devices.

5. The combination as defined in claim 1, wherein said connecting means include a connecting plate connected to a rim of the wheel to which each respective spacer is connected.

6. The combination as defined in claim 5, wherein said connecting means further include a tightener to brace a respective spacer to said connecting plate.

7. The combination as defined in claim 6, wherein said spacers are each tubular, each spacer accommodating a respective tightener and being formed with windows to provide access to said tightener.

8. The combination as defined in claim 5, wherein each spacer is tubular, said connecting means further including a clamping bolt extending through said spacer, a clamping nut connected to said connecting plate and receiving said bolt to clamp it to said rim of the wheel, each of said two wheels of the track aggregate including an axle stump connected thereto and having a central bore, said bolt extending through said central bore, said axle stump supporting a hub of the respective wheel on the underframe of the track aggregate.

9. The combination as defined in claim 8, wherein said clamping bolt includes a threaded portion, a bolt head and an elongated portion between said threaded portion and said head, said elongated portion being of a diameter greater than that of said threaded portion to form therebetween an annular shoulder, said connecting means further including a clamping element axially abutting against said shoulder in a clamped position of said bolt, said clamping element being connected to an end face of said hub, which faces the vehicle wheel.

10. The combination as defined in claim 9, wherein said head of said clamping bolt is inserted in said central bore of said axle stump in the clamped position of said bolt.

11. The combination as defined in claim 1, wherein said spacers are rigidly connected to said wheels of said track aggregates and supported thereby.

12. The combination as defined in claim 11, wherein said two wheels of each of said track aggregates are steering wheels which are arranged at a front and a rear end of each track aggregate, respectively, said two wheels being positioned on a front and a rear drive axle of the vehicle, respectively and simultaneously being drive wheels.

13. The combination as defined in claim 1, wherein the length of each spacer is selected so that each track aggregate is positioned laterally of and close to the vehicle.

14. The combination as defined in claim 1, wherein each spacer is dimensioned so that the spacers, with the track aggregates mounted to the vehicle, are engaged in outer rim flanges of the respective wheels of the vehicle.

15. The combination as defined in claim 6, wherein said track aggregates are dimensioned so that said spacers with respective connecting plates are positioned at an adjusted level to said drive axles before assembling of said track aggregates.

16. The combination as defined in claim 1, wherein the underframe of each track aggregate is subdivided into two elongated portions which are movable relative to each other and can perform relative motions about an axis of elongation of the underframe.

17. The combination as defined in claim 16, wherein said elongated portions of each underframe are telescopically connected to each other whereby a withdrawal of each portion is limited by the length of said track.

18. The combination as defined in claim 1, wherein said steering means are actuated independently from a wheel steering of the vehicle.

* * * * *